United States Patent [19]
Yamano

[11] Patent Number: 5,585,883
[45] Date of Patent: Dec. 17, 1996

[54] AUTOMATIC FOCUS ADJUSTMENT DEVICE AND METHOD

[75] Inventor: Shozo Yamano, Tokyo, Japan

[73] Assignee: Nikon Corporation, Tokyo, Japan

[21] Appl. No.: 497,229

[22] Filed: Jun. 30, 1995

[30] Foreign Application Priority Data

Sep. 30, 1994 [JP] Japan .................................. 6-237422

[51] Int. Cl.$^6$ .................................................. G03B 13/36
[52] U.S. Cl. .............................. 396/91; 396/95; 396/133
[58] Field of Search .................................. 354/402, 406, 354/407, 408; 250/201.2, 201.7, 201.8

[56] References Cited

U.S. PATENT DOCUMENTS 4,969,003  11/1990  Ohnuki et al. ............................ 354/402

Primary Examiner—W. B. Perkey
Attorney, Agent, or Firm—Oliff & Berridge

[57] ABSTRACT

An automatic focus adjustment device that can effect focussing on a moving subject. The automatic focus adjustment device includes a lens driving device, a focus state detection device that detects the defocus amount, an image velocity computation device that computes the subject image movement velocity, and a moving subject prediction device that computes a predicted value for the defocus amount at exposure based on the defocus amounts and the subject image movement velocity. The device also includes a predicted position control device that scrolls the shooting lens by the predicted value, a position velocity control device that controls the scrolling amount in accordance with the defocus amount and the amount of change of the defocus amount with time, a determination device that determines whether or not the control action of the predicted position control device can be completed before exposure, and prior to a release a selection device selects control by the predicted position control device. After release, the selection device selects control by the predicted position control device when the determination device determines the control action can be completed. Otherwise, the selection device selects control by the position velocity control device.

23 Claims, 10 Drawing Sheets

| SCROLLING AMOUNT | DRIVING TIME |
|---|---|
| 125 μm | 40 m sec |
| 250 | 60 |
| 500 | 80 |
| 1000 | 90 |
| 2000 | 100 |
| 3000 | 120 |

FIG. 8

AUTOMATIC FOCUS ADJUSTMENT DEVICE AND METHOD

BACKGROUND OF THE INVENTION

1. Field of the Invention

An automatic focus adjustment device that automatically adjusts focussing corresponding to the velocity of a moving subject.

2. Description of Related Art

A conventional automatic focus adjustment device performs automatic focus adjustment relative to moving subjects.

FIG. 10A is a diagram showing focus adjustment by one conventional type of automatic focus adjustment device. The horizontal axis represents time and the vertical axis represents the scrolling amount of the shooting lens given a predetermined position, for example, infinity as a reference point. The subject image trace is the ideal lens scrolling position trace if the device maintains continuous focus on a moving subject. The lens focus position trace is the trace of an actual scrolling amount of the lens position.

With this type of automatic focus adjustment device, the lens scrolling mechanism monitors, as an error control, the focus shift amount (hereafter defocus amount) of the shooting lens and the change in the defocus amount with time. The defocus amount is the amount the lens focus position trace follows the subject image trace, When a release button is depressed at time Tnow, the controlled positioning of the lens scrolling mechanism focus position is changed by the amount DEFx. The defocus amount DEFx at the exposure time Tex is determined using a linear approximation based on the defocus amount computed prior to release and the amount of change in the defocus amount with time. In this way, the focus is adjusted to the predicted position of the subject image at the exposure time, Tex.

With this type of conventional automatic focus adjustment device, a certain amount of lens scrolling mechanism deceleration time is needed. The deceleration time halts the lens scrolling mechanism with a high degree of precision at the predicted position of the subject image. Consequently, the desired driving amount cannot be achieved within the limited length of time (from Tnow to Tex) for a subject with a fast movement velocity. Thus, it is impossible to effect focussing at the exposure time Tex for a high velocity subject, as shown in FIG. 10B.

SUMMARY OF THE INVENTION

The present invention solves the above and other problems, by providing an automatic focus adjustment device that effects focussing quickly and appropriately relative to moving subjects.

The invention provides an automatic focus adjustment device, including a lens driving device, a focus state detection device, an image velocity computation device, a moving subject prediction device, a predicted position control device, a position velocity control device, a determination device, and a selection device. The lens driving device causes the shooting lens scrolling amount to change. The focus state detection device repeatedly detects the defocus amount of the subject image composed by the shooting lens. The image velocity computation device computes the movement velocity of the subject image based on the successive defocus amounts detected by the focus state detection device. The moving subject prediction device predicts the defocus amount at the time of exposure based on the successive defocus amounts and the subject image movement velocity computed by the image velocity computation device.

The predicted position control device controls the scrolling amount by the lens driving device to correspond to the exposure predicted defocus amount computed by the moving subject prediction device. The position velocity control device controls the scrolling amount according to the focus state detection device defocus amount and its change over time. The determination device determines whether the control action of the predicted position control device can be completed before exposure.

The selection device selects either the predicted position control device or the position velocity control device to control the shooting lens position through a control action. The selection device selects the predicted position control device for control either before a release action or when the determination device determines that the control action can be completed before exposure. The selection device selects the position velocity control device for control when the control action cannot be completed before exposure.

The automatic focus adjustment device determination device determines the predicted position control device control action will complete before exposure, if the predicted defocus amount computed by the moving subject prediction device is not greater than a predetermined value or if the time needed for lens driving over the predicted defocus amount is not greater than a predetermined length of time.

Both the predicted position control device and the position velocity control device can control the lens driving position. The predicted position control performs position control so that the shooting lens focus matches the position of the subject image predicted at exposure. The position velocity control device causes the shooting lens focus to follow the movement trace of the subject image based on the defocus amount and the defocus amount change time as feedback to the lens driving device.

The position velocity control device causes the amount of change in the defocus amount with time, which is a very small amount, to be provided as feedback. Consequently, the high frequency noise components are large in number, so the in-focus position precision is inferior in comparison to the predicted position control device.

For a subject with a large movement velocity, the amount of change in the defocus amount with time becomes large, which causes the feedback amount to become large. However, no deceleration time interval is necessary to halt the shooting lens. Therefore, maintaining focus for a high velocity subject is possible for the position velocity control device.

The determination device determines whether the control action by the predicted position control device will be completed by the time of exposure.

If the determination device determines that completion is possible, after a release action the selection device selects the predicted position control device to control of the lens driving. Through the selection, it becomes possible to effect focussing at the predicted position of the subject with high precision.

On the other hand, if the determination device determines that completion is impossible, after a release the selection device selects the position velocity control device to control the lens driving device. Through the selection, achieving focus for high velocity subjects becomes possible.

One method of the automatic focus adjustment device determination device compares the predicted value of the defocus amount computed by the moving subject prediction device to a threshold value. When the predicted value of the defocus amount is small, the distance over which the shooting lens is driven is short. Consequently, it is possible to determine simply and with accuracy that the control action of the predicted position control device can be completed before exposure.

Alternatively, the automatic focus adjustment device determination device can use the required time to drive the shooting lens the predicted defocus amount. Then, the required time to drive the predicted defocus amount can be compared to or used as a threshold value.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 8 is a drawing showing the relationship between the driving time and the scrolling amount of the shooting lens of the automatic focus adjustment device of the present invention;

DETAILED DESCRIPTION OF PREFERRED EMBODIMENTS

Figure 1:
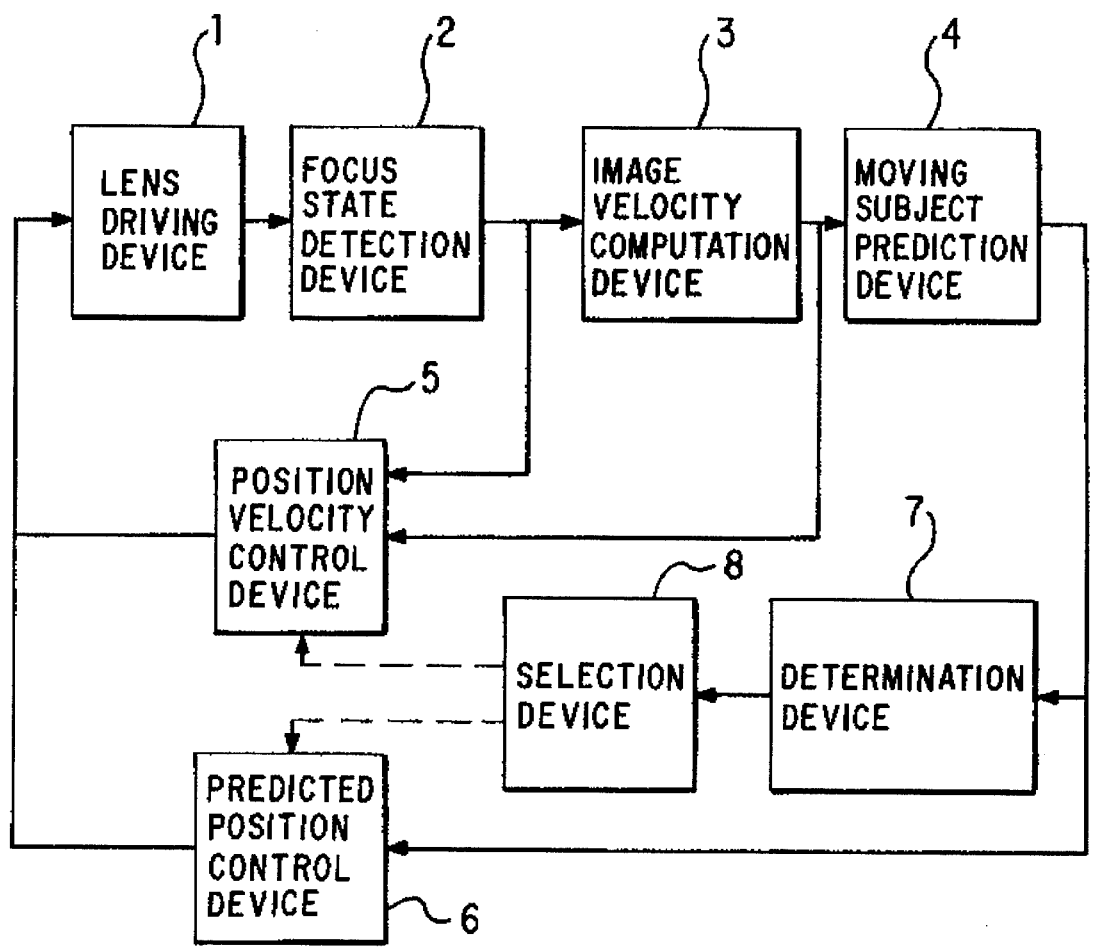
FIG. 1 is a block diagram showing an automatic focus adjustment device according to one embodiment of the present invention.
Figure 2:
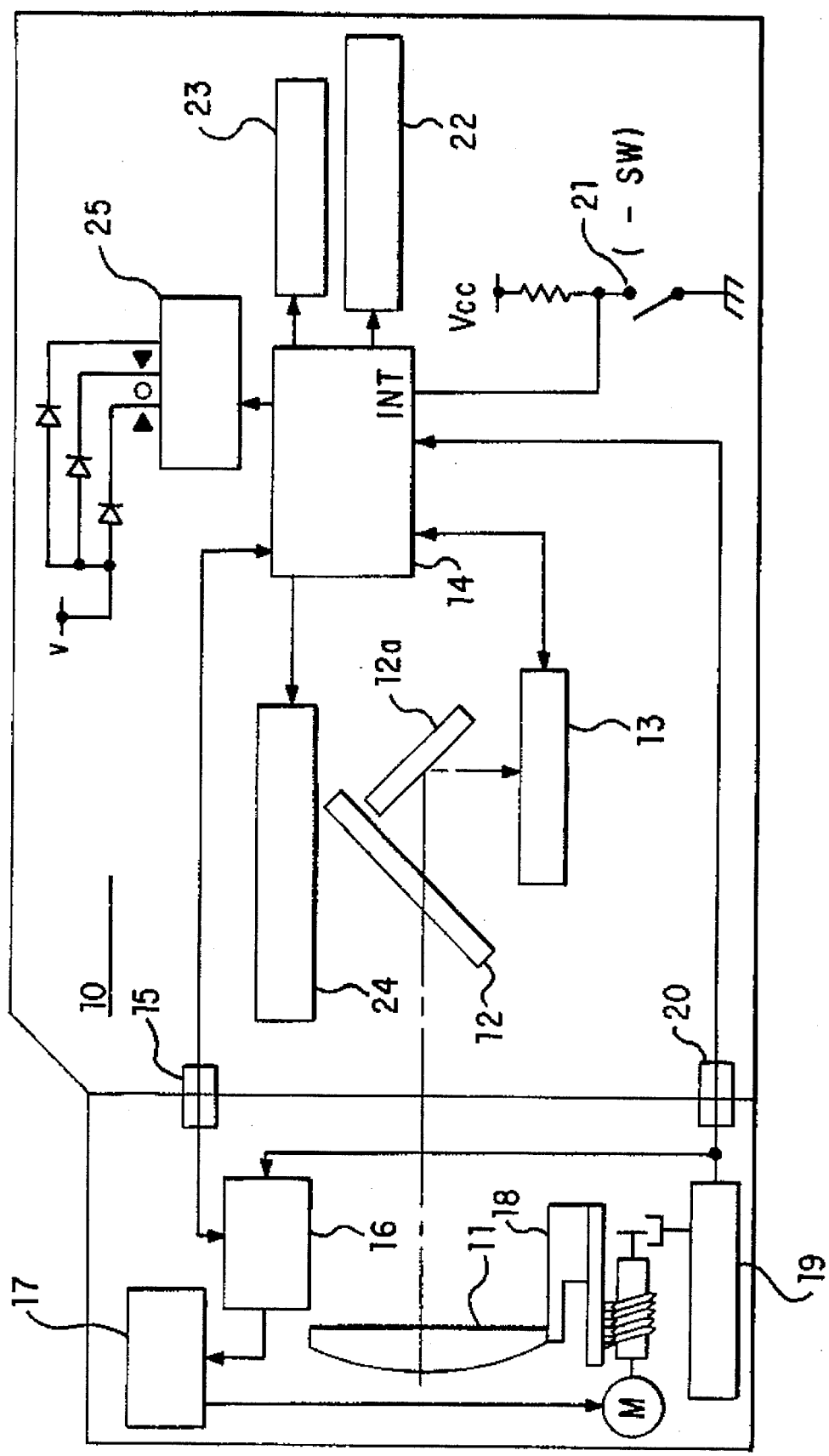
FIG. 2 is a schematic diagram showing an automatic focus adjustment device of the present invention.

FIG. 1 is a block diagram showing an automatic focus adjustment device according to a first preferred embodiment. FIG. 2 shows a camera equipped with the automatic focus adjustment device. A shooting lens 11 is mounted on a camera 10. A quick return mirror 12 and an auxiliary mirror 12a are positioned along the optical axis of the shooting lens 11. A photoelectric conversion device 13 is situated at the position illuminated by light that is reflected from the auxiliary mirror 12a. The photoelectric conversion device 13 connects to a microcomputer 14.

A lens microcomputer 16 connects to a microcomputer 14 through a connection group 15. The lens microcomputer 16 connects to a lens driving mechanism 18 through a motor driving circuit 17. The lens driving mechanism 18 contains a rotation detection circuit 19 that generates a string of pulses corresponding to the motor driving amount to detect a scrolling amount of the shooting lens. The rotation detection circuit 19 connects to the lens microcomputer 16 and through a connection group 20 to the microcomputer 14.

In addition, a release switch 21 connects to the interruption terminal of the microcomputer 14. A shutter control circuit 22, an aperture stop control circuit 23, a sequence driving circuit 24 and a focus display driving circuit 25 also connect to the microcomputer 14.

As shown in FIG. 1, the scrolling amount of the shooting lens 11 is changed by a lens driving device 1, including at least the motor driving circuit 17 and the lens driving mechanism 18. A defocus amount of a subject image is detected by a focus state detection device 2 that includes at least the photoelectric conversion device 13.

The focus state detection device 2 supplies the defocus amount to an image velocity computation device 3 that includes at least the microcomputer 14 and to a position velocity control device 5 that includes at least the lens microcomputer 16. The image velocity computation device 3 computes the movement velocity of the subject image. The subject image movement velocity is supplied to the position velocity control device 5 and to a moving subject prediction device 4, which includes at least the microcomputer 14.

The moving subject prediction device 4 supplies the predicted defocus amount to a determination device 7 that includes at least the microcomputer 14 and to a predicted position control device 6 that includes at least the lens microcomputer 16.

The determination device 7 supplies determination results to a selection device 8 that includes at least the microcomputer 14. The selection device 8 selects and supplies the selected operation amount to the lens driving device 1. The selected operation amount is either the position velocity control device 5 operation amount or the predicted position control device 6 operation amount.

Figure 3:
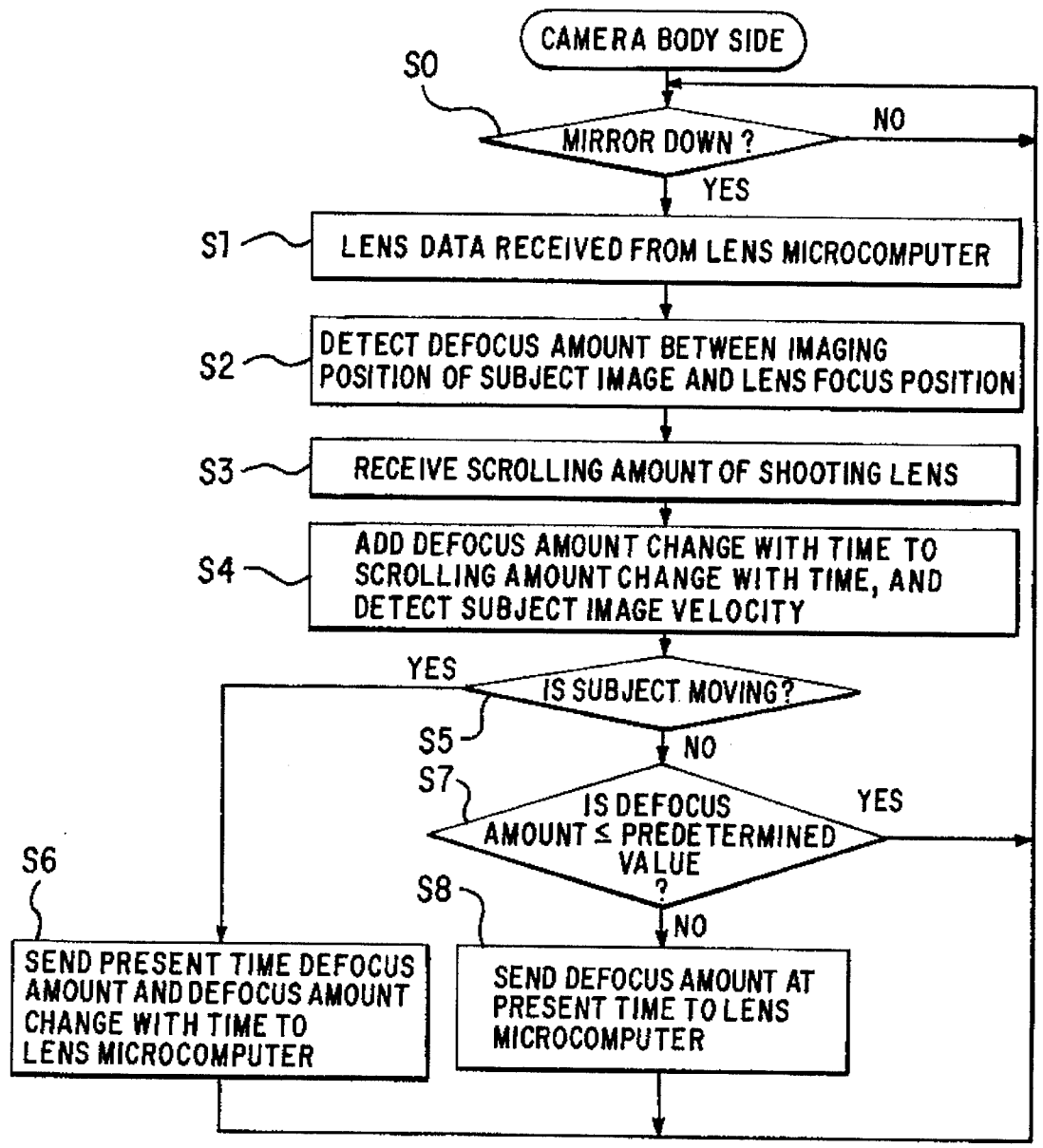
FIG. 3 is a flowchart showing the operations of the camera body side of an automatic focus adjustment device of the present invention.
Figure 4:
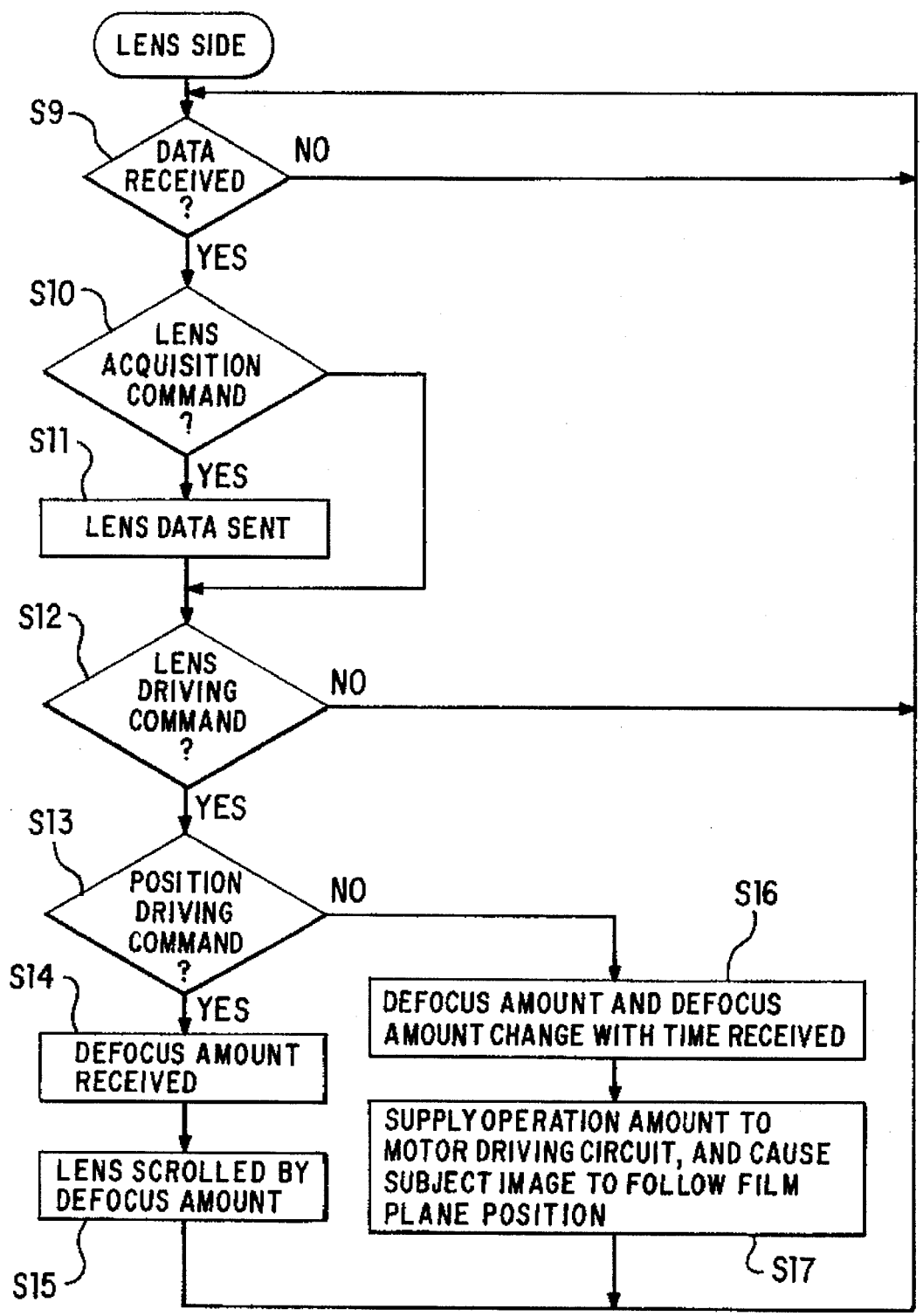
FIG. 4 is a flowchart showing the operations of the lens side of an automatic focus adjustment device of the present invention.
Figure 5:
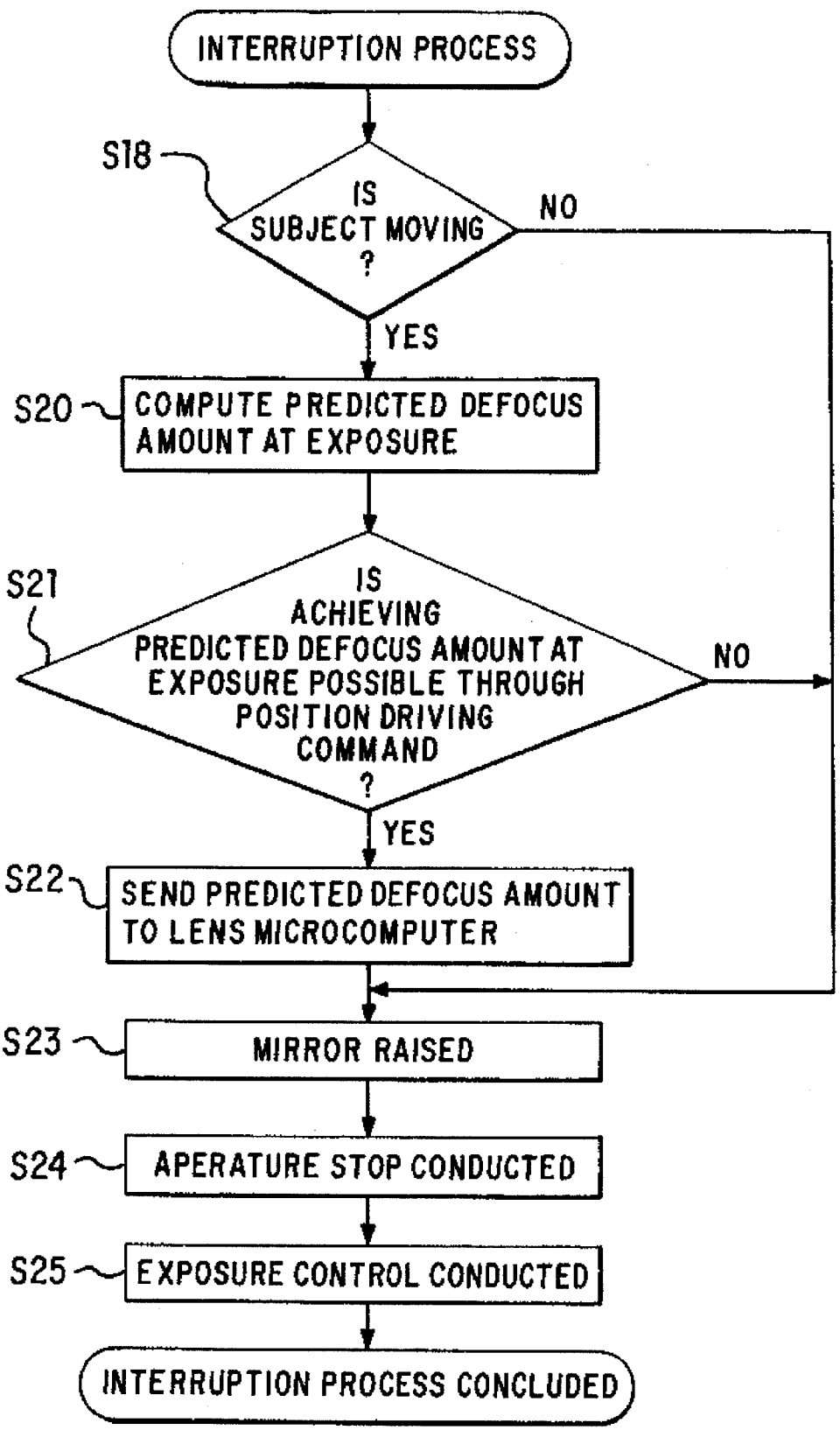
FIG. 5 is a flowchart showing the interruption process of an automatic focus adjustment device of the present invention.

FIG. 3 through 5 are flowcharts showing operations of the automatic focus adjustment device according to the present invention. The operations of the camera body side of the camera are shown in FIG. 3. When the microcomputer 14 is started, the memories are initialized, and initial settings are made for the various functions such as the event count function, the external interruption function, the A/D conversion circuit, the serial communication function and the input/output port and the like. Then, the program waits for the quick return mirror 12 to be lowered in step S0.

When the mirror is lowered, the microcomputer 14 sends a lens acquisition command to the lens microcomputer 16 and receives lens data peculiar to the lens in step S1. A portion of the light rays incident from the shooting lens 11 pass through the quick return mirror 12, reflect off auxiliary mirror 12a, and illuminate the photoelectric conversion device 13.

Figure 6:
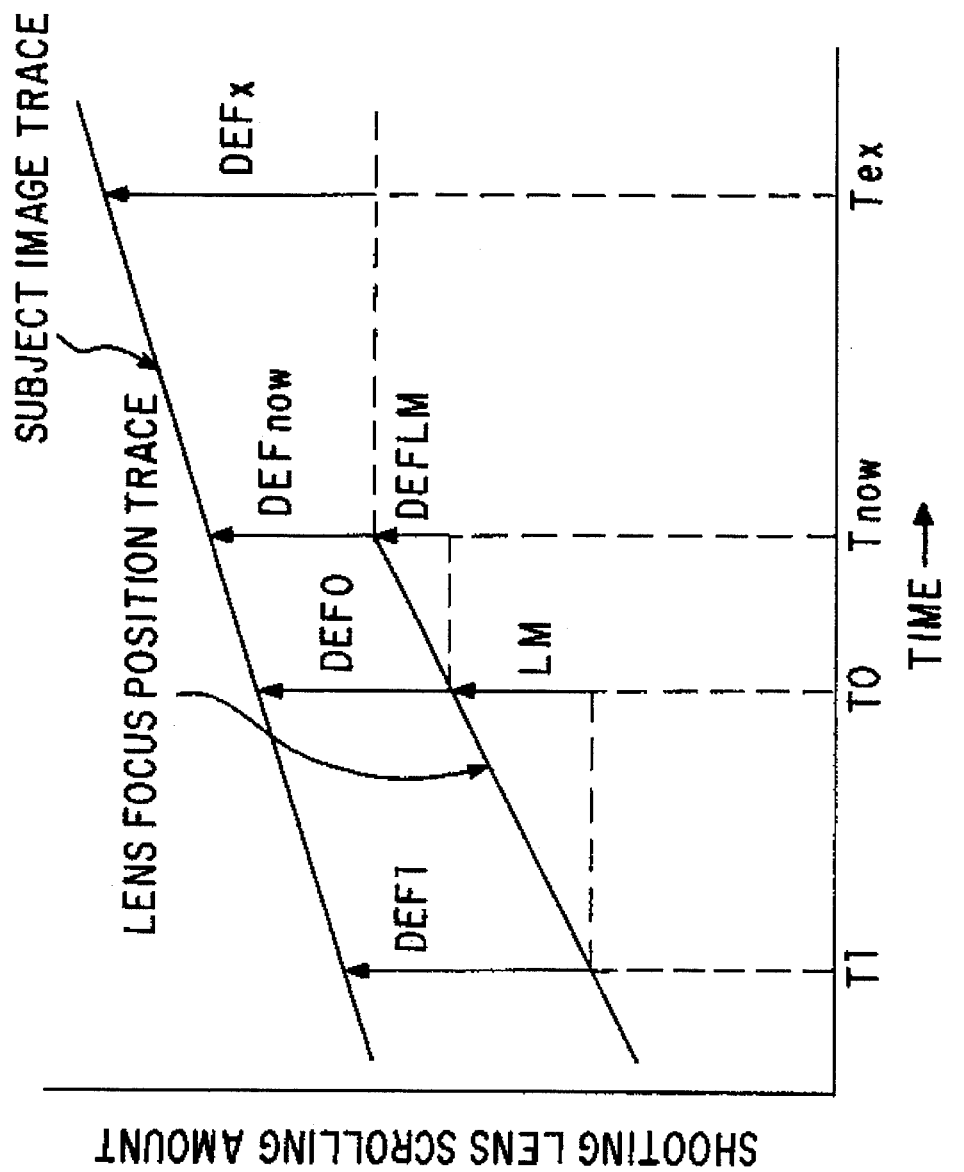
FIG. 6 is a summary drawing showing the trace of the subject image in the automatic focus adjustment device of the present invention.

The microcomputer 14 receives the output from the photoelectric conversion device 13 and conducts computations using phase difference detection methods that are well known in the art. In step S2, the microcomputer 14 repeatedly detects the defocus amount DEF0 at time T0 as shown in FIG. 6. The defocus amount detected at the previous time T1 is labelled DEF1.

In step S3, the microcomputer 14 determines the scrolling displacement LM of the shooting lens between times T1 and T0. The value LM can be obtained by counting the number of pulses input from the rotation detection circuit 19 during the interval from time T1 to time T0. Then, the microcomputer 14 converts the pulse number into the defocus amount (linear units) using data defining the image plane displacement per pulse obtained through communication with the lens microcomputer 16.

The microcomputer 14 computes in step S4 the subject image velocity V0 relating to the position (e.g., the second principal point position) of the shooting lens as set forth in Equation (1):

$$V0=(DEF0+LM-DEF1)/(T0-T1) \quad (1)$$

Figure 7A:
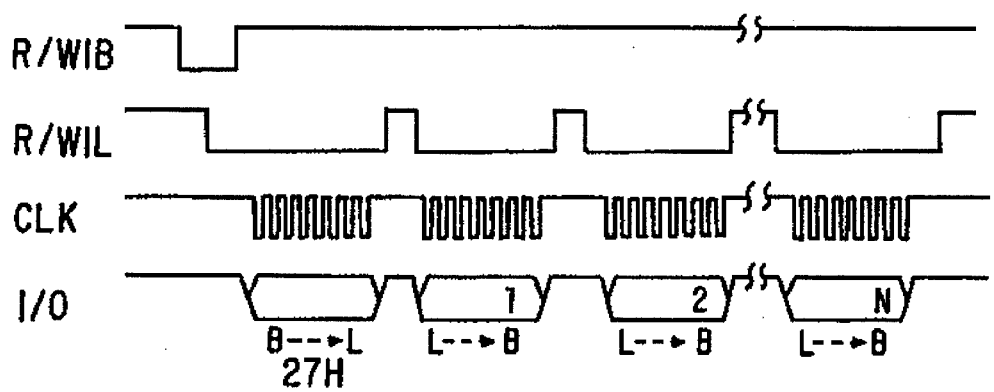
FIGS. 7A–C are drawings showing one example of the command signal waveform of the automatic focus adjustment device of the present invention.
Figure 7B:
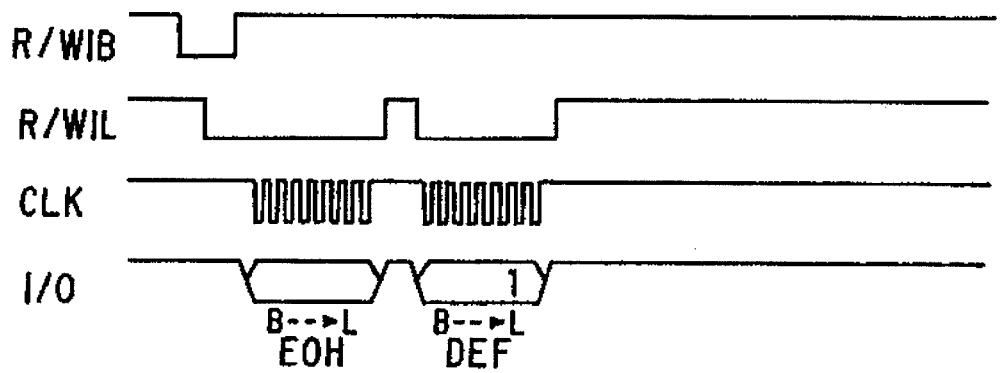
Figure 7C:
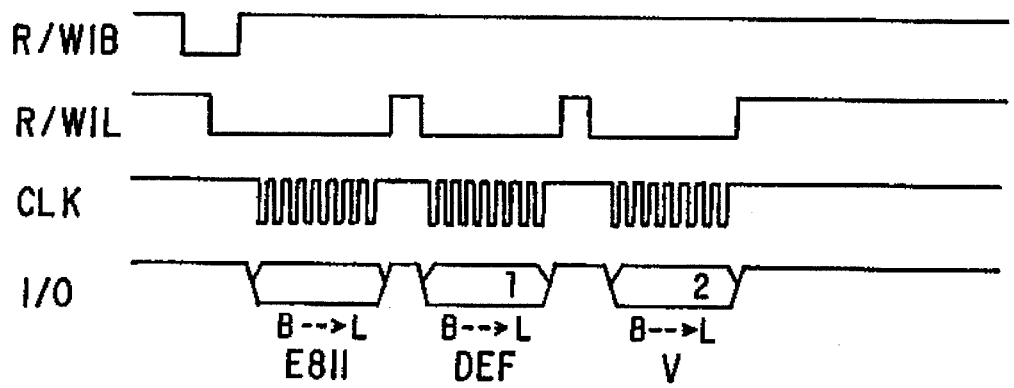

When the movement of the subject image velocity determined by Equation (1) is continuous in the same direction, the subject is determined to be a moving subject in step S5. In step 6 a velocity driving command, the defocus amount, and the defocus amount change over time for a moving subject are supplied to the lens microcomputer 16, as shown in FIG. 7C.

In contrast, when the subject is stationary, the defocus amount is compared to a predetermined value in step S7. When the defocus amount is larger than the predetermined value, the focus of the shooting lens 11 is determined to be shifted. Then in step S8, a position driving command with the defocus amount is supplied to the lens microcomputer 16, as shown in FIG. 7B. These operations are repeatedly executed.

The operations of the lens side of the camera are shown in FIG. 4. In step S9, the lens microcomputer 16 receives data from the microcomputer 14 and then conducts the process operations as described below according to the received data.

In step S10, the received data is checked for a lens data acquisition command. When a lens data acquisition command is received, the lens microcomputer 16 sends lens data concerning the shooting lens 11 to the microcomputer 14 in step S11.

In step S12, the received data is examined to determine if the data is a velocity driving command. The received defocus amount and the defocus amount change over time are weighted and added together. They are then provided as feedback to the motor driving circuit 17 in steps S16 and S17.

When the received data is a position driving command in step S13, the shooting lens 11 is scrolled by the received defocus amount in steps S14 and S15.

An interruption process of the microcomputer 14 starts when the release switch 21 is completely depressed. The operations of the interruption process are shown in FIG. 5.

First, when the subject is stationary, the focus adjustment actions have already been started in step S7 and S8. Therefore, the photography operation is performed (steps S23, S24 and S25) without driving the shooting lens 11 again, and the interruption process concludes.

On the other hand, when the subject is a moving subject, in step S20 the predicted value DEFx of the defocus amount at the exposure time Tex is computed as set forth in Equation (2):

$$DEFx=V0*(Tex-T0)+DEF0-DEFLM \quad (2)$$

In Equation (2), V0 is the subject image velocity, DEF0 is the defocus amount at the most recent time T0, and DEFLM is the scrolling amount from time T0 to the present time Tnow.

Based on the computed predicted value DEFx the microcomputer 14 determines whether focussing is possible in step S21 through position driving before the exposure time Tex. In other words, the microcomputer 14 receives the relationship between the driving time and the scrolling amount of the shooting lens 11 through an interchange of lens data from the lens microcomputer 16. An example of the relationship between driving time and scrolling amount is shown in FIG. 8. The microcomputer 14 computes the required time t needed to drive the shooting lens 11 by the amount of the predicted value DEFx through extrapolation and interpolation of the driving time and scrolling amount relationship data. For example, supposing the predicted value DEFx was 800 μm, the required time t needed for driving of the shooting lens 11 is computed as set forth in Equation (3):

$$(t-80): (800-500)=(90-80): (1000-500) \quad (3)$$

using the lens data shown in FIG. 8.

If the required time t is not greater than the time interval (Tex-Tnow) from the present time until the exposure, focussing can be completed with high accuracy through the position driving command.

Alternatively, taking the time interval (Tex-Tnow) from the present time until exposure to be 70 msec, the scrolling amount that can be driven during this interval is 375 μm using interpolation and the lens data shown in FIG. 8. Using 375 μm as a threshold value and comparing the threshold value with the predicted value DEFx is another possible method to determine whether the action can be completed.

If focussing can be completed through position driving, a position driving command and the predicted value DEFx are sent to the lens microcomputer 16 in step S22. Then, after focussing with a high degree of precision, photography operation is conducted in steps S23, S24 and S25.

If position driving command completion is not possible, in step S22 high velocity scrolling adjustment of the shooting lens 11 continues through a velocity driving command. Then, the photograph operation is conducted in steps S23, S24 and S25.

Figure 9A:
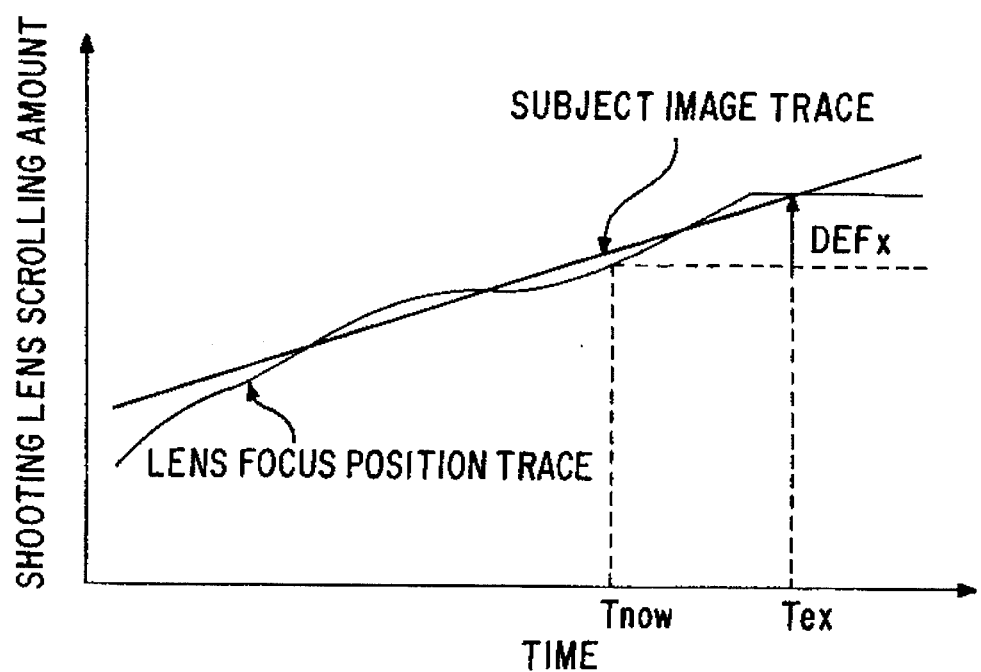
FIG. 9 is a drawing showing the focus adjustment of the automatic focus adjustment device of the present invention.
Figure 9B:
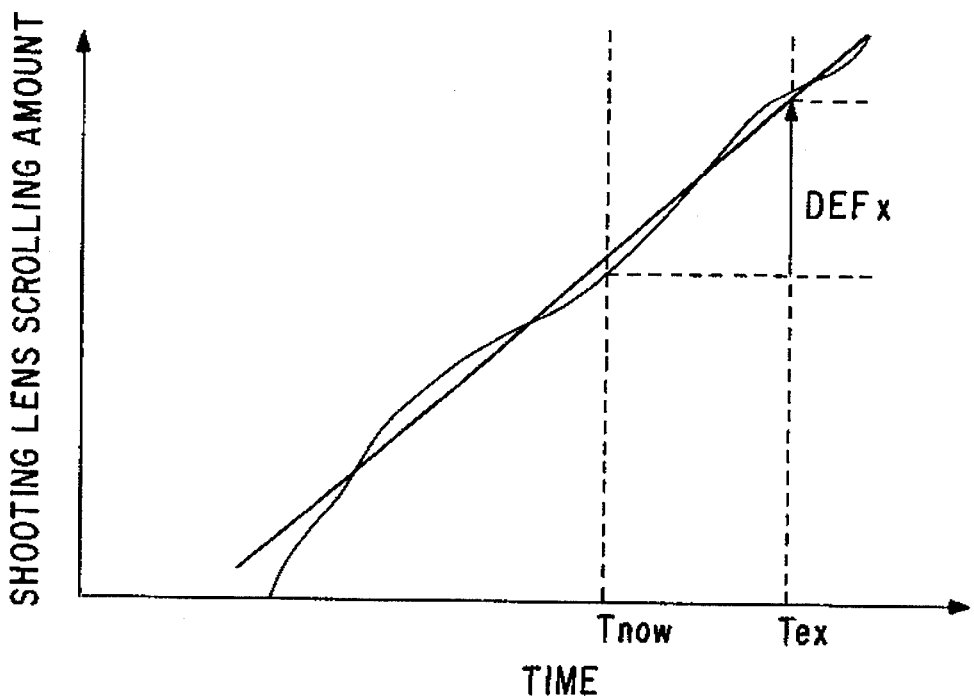
Figure 10A:
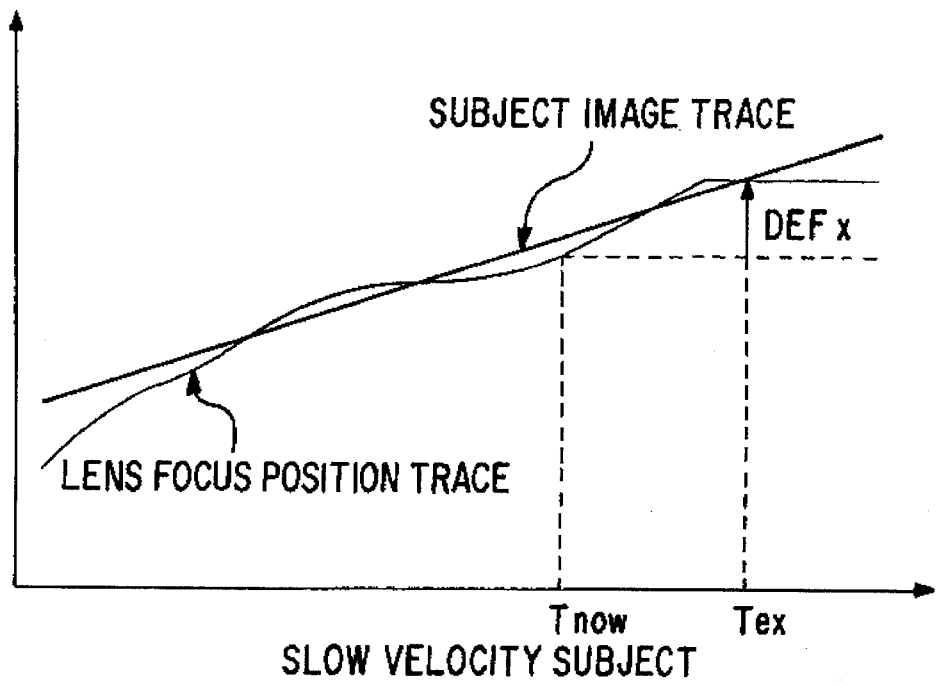
FIGS. 10A and 10B are drawings showing the focus adjustment of one type of conventional device.
Figure 10B:
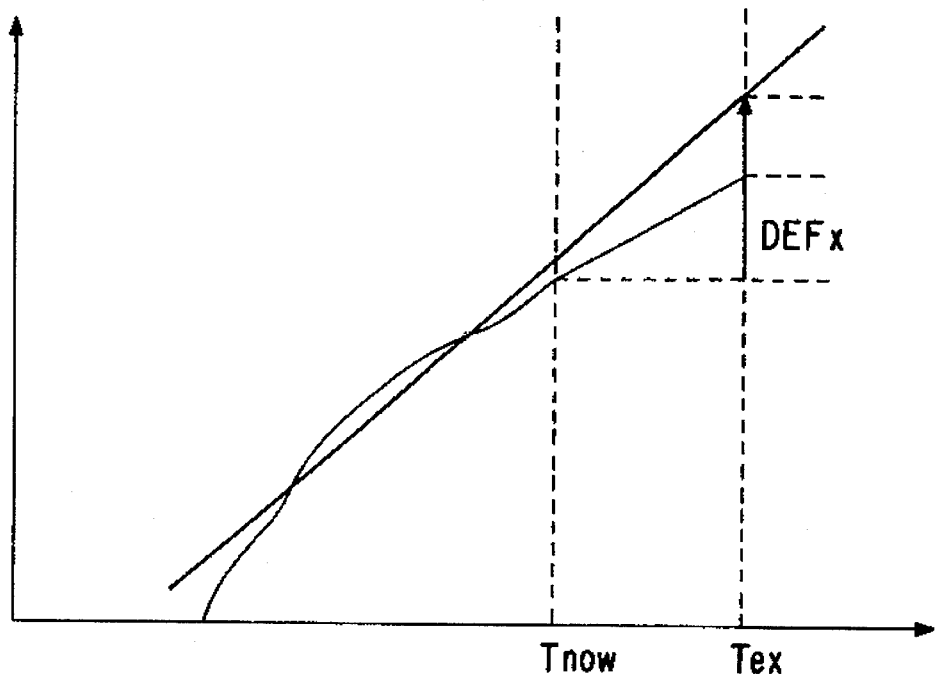

The automatic focus adjustment device performs scrolling of the shooting lens through a position driving command when the velocity of the subject is small, as shown in FIG. 9, to focus with a high degree of position precision. Further, when the velocity of the subject is large, scrolling adjustment of the shooting lens is performed through a velocity driving command to adjust the focus so as to match the high velocity subject. Thus, the focus shift of the high velocity subject can be reduced at exposure.

The determination whether focussing can be completed through the position driving command is made before exposure by comparing the predicted value DEFx (predicted defocus amount) at exposure with a predetermined value received in the lens data. However, the method is intended to be illustrative and not limiting, for it would also be acceptable to determine that completion is possible when the velocity V0 is smaller than a predetermined velocity.

Further, the determination whether completion is possible is made based on the lens data shown in FIG. 8. This determination is also intended to be illustrative and not limiting. For example, be acceptable to setting a scrolling amount threshold for the shooting lens 11 before exposure would also be acceptable. Then, completion is possible if the predicted value DEFx is not greater than the threshold value. The threshold value could also be provided with the lens data received from the shooting lens.

In summary, the predicted position control device having high precision position focussing is selected when its control action can be completed before exposure. Consequently, high precision focussing is effected at the predicted position of the subject at exposure.

Further, when the control action is not possible, the position velocity control device, capable of effecting high velocity subject focussing, is selected. Consequently, it is possible to reduce the focus shift at exposure relative to a high velocity subject.

The determination of whether the control action of the predicted position control device can be completed by the time of exposure can be made based on the size of the predicted value of the defocus amount computed by the moving subject prediction device. Consequently, it is possible to make the determination simply and with accuracy.

In this way, with a camera using the present invention, it is possible to effect focussing at high velocity relative to a subject that is moving at a high velocity, while also focussing with a high degree of precision relative to a subject that is moving at slow velocity. Therefore, prompt and accurate focus adjustment corresponding to the velocity of movement of the subject is performed.

While the invention has been described in relation to preferred embodiments, many modifications and variations are apparent from the description of the invention, and all such modifications and variations are intended to be within the scope of the present invention as defined in the appended claims.

What is claimed is:

1. An automatic focus adjustment device, comprising:

lens driving means for driving a shooting lens by a scrolling amount;

focus state detection means for detecting defocus amounts of a subject image;

image velocity computation means for computing movement velocity of the subject image based on the detected defocus amounts;

moving subject prediction means for predicting a predicted defocus amount at exposure based on the detected defocus amounts and the computed movement velocity;

predicted position control means for controlling the scrolling amount of the lens driving means so the scrolling amount becomes the predicted defocus amount;

position velocity control means for controlling the scrolling amount of the lens driving means corresponding to the detected defocus amounts and a change over time of the detected defocus amounts;

determination means for determining whether a control action of the predicted position control means can be completed before exposure; and selection means for selecting control by one of the predicted position control means and the velocity control means, the selection means selecting control by the predicted position control means when the determination means determines the control action can be completed before exposure, the selection means selecting control by the position velocity control means when the determination means determines the control action cannot be completed before exposure.

2. The automatic focus adjustment device according to claim 1, wherein the determination means determines that the control action of the predicted position control means can be completed before exposure if the predicted defocus amount is not greater than a predetermined value.

3. The automatic focus adjustment device of claim 2, wherein the predetermined value is calculated form lens data and a time interval from a present time until exposure.

4. The automatic focus adjustment device of claim 2, wherein the predetermined value is preset based on lens specific data.

5. The automatic focus adjustment device according to claim 1, wherein the determination means determines that the control action of the predicted position control means can be completed before exposure if a time needed to drive the shooting lens over the predicted defocus amount is not greater than a predetermined length of time.

6. The automatic focus adjustment device according to claim 1, wherein the selection means selects control by the predicted position control means prior to actuation of a release switch.

7. The automatic focus adjustment device according to claim 1, wherein the selection means selects control between the predicted position control means and the position velocity control means after actuation of a release switch.

8. The automatic focus adjustment device according to claim 1, wherein the determination means determines that the control action of the predicted position control means can be completed before exposure if the movement velocity of the subject image is not greater than a predetermined value.

9. The automatic focus adjustment device according to claim 1, wherein the determination means determines that the control action of the predicted position control means can be completed before exposure if a scrolling amount required to focus the shooting lens is not greater than a predetermined value.

10. An automatic focus adjustment device for driving a shooting lens of a camera, the device comprising:

a lens driving device that drives the shooting lens;

a focus state detection device that detects defocus amounts of a subject image;

an image velocity computation device that computes movement velocity of the subject image based on the detected defocus amounts;

a moving subject prediction device that predicts a predicted defocus amount at time of exposure based on the detected defocus amounts and the computed movement velocity;

a predicted position control device that controls the scrolling amount to approximately equal the predicted defocus amount at exposure;

a position velocity control device that controls the scrolling amount of the lens driving device to correspond with the detected defocus amounts and a change over time of the detected defocus amounts; and a determination device that determines whether a control action of the predicted position control device can be completed before exposure, the determination device selecting control by the predicted position control device when the control action can be completed before exposure, the determination device selecting control by the position velocity control device when the control action can not be completed by the predicted position control device.

11. The automatic focus adjustment device according to claim 10, wherein the determination device determines that the control action of the predicted position control device can be completed before exposure if the predicted defocus amount is not greater than a predetermined value.

12. The automatic focus adjustment device of claim 11, wherein the predetermined value is calculated form lens data and a time interval from a present time until exposure.

13. The automatic focus adjustment device of claim 11, wherein the predetermined value is preset based on lens specific data.

14. The automatic focus adjustment device according to claim 10, wherein the determination device determines the control action of the predicted position control device can be completed before exposure if a time needed to drive the shooting lens over the predicted defocus amount is not greater than a predetermined length of time.

15. The automatic focus adjustment device according to claim 10, wherein the determination device further selects control by the predicted position control device prior to actuation of a release switch.

16. The automatic focus adjustment device according to claim 10, wherein the determination device further selects control between the predicted position control device and the position velocity control device after actuation of a release switch.

17. The automatic focus adjustment device according to claim 10, wherein the determination device determines that the control action of the predicted position control device can be completed before exposure if the movement velocity of the subject image is not greater than a predetermined value.

18. The automatic focus adjustment device according to claim 10, wherein the determination device determines that the control action of the predicted position control device can be completed before exposure if the scrolling amount required to focus the shooting lens is not greater than a predetermined value.

19. A method of performing automatic focus adjustment of a shooting lens of a camera comprising the steps of:

detecting defocus amounts of the subject image;

computing a movement velocity of the subject image based on the detected defocus amounts;

predicting a predicted defocus amount at the time of exposure based on the detected defocus amounts and the computed movement velocity;

determining whether the shooting lens can be scrolled to the predicted defocus amount before exposure;

scrolling the shooting lens by the predicted defocus amount if the determining step determines the shooting lens can be scrolled to the predicted defocus amount before exposure; and scrolling the shooting lens such that the scrolling amount corresponds with the detected defocus amount and a change over time of the defocus amounts if the determining step determines the shooting lens cannot be scrolled to the predicted defocus amount before exposure.

20. The method of claim 19, wherein the determining step determines the control action can be completed before exposure if the predicted defocus amount is not greater than a predetermined value.

21. The method of claim 20, wherein the predetermined value is calculated from lens data and a time interval from a present time until exposure.

22. The method of claim 20, wherein the predetermined value is preset based on lens specific data.

23. The method of claim 19, wherein the determining step determines the control action can be completed before exposure if the time needed to drive the shooting lens over the predicted defocus amount is not greater than a predetermined length of time.

* * * * *